(12) United States Patent
Black

(10) Patent No.: US 7,739,795 B1
(45) Date of Patent: Jun. 22, 2010

(54) METHOD OF MANUFACTURING A CORNER MODULE ASSEMBLY

(75) Inventor: David Reed Black, Livonia, MI (US)

(73) Assignee: Robert Bosch GmbH, Stuttgart (DE)

( * ) Notice: Subject to any disclaimer, the term of this patent is extended or adjusted under 35 U.S.C. 154(b) by 1169 days.

(21) Appl. No.: 11/307,513

(22) Filed: Feb. 10, 2006

(51) Int. Cl.
    *B21D 53/26* (2006.01)
(52) U.S. Cl. ................................. 29/894.361
(58) Field of Classification Search .................... 29/428, 29/894.361, 894.362, 898.062, 407.05, 407.1, 29/434, 509, 512, 557, 559; 280/93, 512; 384/560; 82/1.11
    See application file for complete search history.

(56) References Cited

U.S. PATENT DOCUMENTS

| | | | |
|---|---|---|---|
| 5,842,388 A | 12/1998 | Visser et al. | |
| 6,212,981 B1 | 4/2001 | Brinker et al. | |
| 6,829,825 B1 | 12/2004 | Bowman et al. | |
| 7,159,316 B2 * | 1/2007 | Sadanowicz et al. | ... 29/894.361 |
| 7,177,599 B2 * | 2/2007 | Nakazawa et al. | ......... 455/63.1 |

\* cited by examiner

*Primary Examiner*—John C Hong
(74) *Attorney, Agent, or Firm*—Maginot, Moore & Beck

(57) ABSTRACT

A method of manufacturing a corner module assembly wherein a wheel hub is attached to the knuckle and the knuckle is held by a clamping force applied through locator pads and thereafter a radial mounting surface and first and second bosses on the knuckle are machined into parallel alignment with the bases of the locator pads. After a rotor is fixed against the machined radial mounting flange, the first and second braking surfaces on the rotor finished machined, if necessary, into the same parallel alignment with the bases such that first and second friction member retained in a caliper are located in parallel alignment with the first and second braking surfaces when the caliper that is attached to the first and second bosses on the knuckle and finally attachments surfaces on the knuckle are machined. This sequentially machining substantially eliminates assembly tolerances of the corner module assembly.

5 Claims, 8 Drawing Sheets

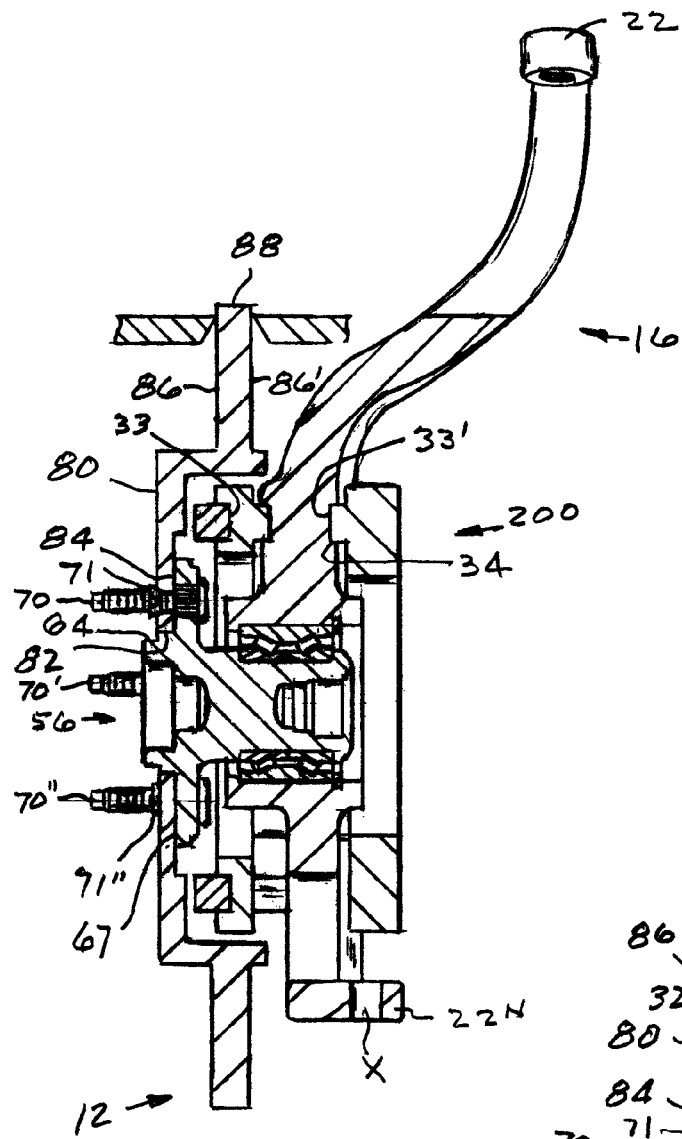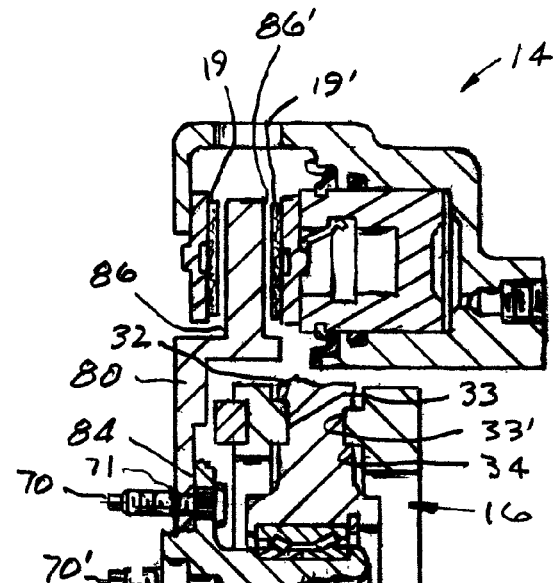
Fig. 13
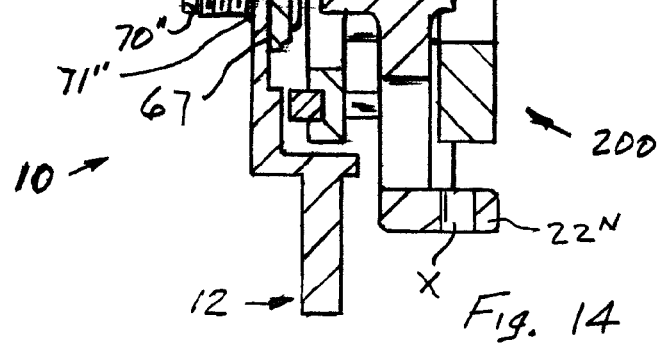
Fig. 14

METHOD OF MANUFACTURING A CORNER MODULE ASSEMBLY

This invention relates to a process of manufacturing a corner module assembly wherein alignment of a rotor and a caliper secured to a knuckle are set by clamping onto locator pads on the knuckle during sequential machining of surfaces to eliminate tolerance assembly accumulation.

BACKGROUND OF THE INVENTION

Disc brake systems are commonly used on the front axle of most vehicles because of efficiency in stopping a vehicle. In such systems, a bearing assembly is fixed to a wheel hub that is bolted to a knuckle, a brake rotor is thereafter attached to the wheel hub and a caliper that is bolted to the knuckle member spans a portion the rotor. The knuckle member is pivotally attached to the frame of the vehicle and a caliper is bolted to the knuckle to locate the first and second friction members on opposite sides of the rotor to define a corner assembly. During braking the friction members are moved into engagement with corresponding braking surfaces on the rotor to effect a brake application. Unfortunately, while the individual manufacturing tolerance of the various components that make up a corner assembly may be within desired limits when the tolerances are combined or added together a relationship may occur wherein a mounting surface on the wheel hub for the rotor and/or braking surface on the rotor are not in perpendicular alignment with the wheel bearing axis of rotation. In an effort to maintain or achieve a perpendicular relationship a process has been proposed in U.S. Pat. No. 6,829,825 to assemble a corner module and machine surfaces on the wheel hub after attachment to a knuckle. While this process does provide an initial perpendicular relationship for the rotor with respect to the axis of the bearing, often on replacement of the rotor the perpendicular relationship is not duplicated.

Later a process was disclosed U.S. patent application Ser. No. 10/904,202 wherein after a hub was attached to a knuckle the machining alignment of the hub flange, braking surfaces on the rotor face and bosses for a caliper mounting are machined by holding onto appendages through which the knuckle is attached to a vehicle. In some situations where all or some of the appendages have different sectional thicknesses and/or length, the knuckle may deflect and/or distort under loads encountered during machining. Unfortunately, such deflection may induce excessive vibration or misalignment as the surfaces are being machined and as a result the desired alignment and/or surface quality of a machined surface are not achieved. Additional machining process steps may be required in the manufacturing process to correct this situation and increase the complexity of the manufacturing a corner assembly.

SUMMARY OF THE INVENTION

It is an object of the present invention to provide a corner module assembly for a vehicle wherein perpendicular alignment is achieved between braking faces on a rotor and an axis for a hub on a knuckle by clamping onto a plurality of locator pads on the knuckle to machine various surfaces that effect the perpendicular alignment.

In more detail, the corner module assembly is manufactured by a method wherein a wheel hub is attached to a knuckle through the following steps:

a knuckle is obtained from a source that has first cylindrical body with an axial bore that extends from a first end to a second end and a plurality of projections that radiate from the cylindrical body wherein each projection has an attachment location area through which the knuckle is fixed to another member;

the knuckle is placed in a first fixture and the axial bore is machined therein along with a first plurality of surfaces that surround the first cylindrical body to define a plurality of locator pads and a second plurality of surfaces to define first and second bosses such that a base for each of the plurality of locator pads is located in a single plane or plurality of planes that are perpendicular to the axial bore and parallel with the first and second bosses;

a bearing assembly is obtained from a source and inserted into the axial bore of the knuckle;

a wheel hub is obtained from a source having a cylindrical body with a first end and a second end, a pilot surface extends from the first end to a peripheral radial mounting flange that is located between the first end and the second end and a peripheral bearing surface that extends from the second end to a shoulder adjacent the radial mounting flange, the mounting flange being distinguished by a plurality of axial openings that are located a fixed radial distance from the axis of the second cylindrical body;

the wheel hub is attached to the knuckle with the bearing assembly being located on the peripheral bearing surface;

the knuckle with the wheel hub attached thereto is placed in a second fixture and held therein by clamping through the plurality of locator pads to define a reference plane;

thereafter, the wheel hub is rotated and the mounting flange is machined to remove any material thereon that is not in perpendicular alignment with the bases of the plurality of locator pads;

finally, first and second bosses on the knuckle are machined to remove any material there from that is not in parallel alignment with the plurality of locator pads;

the knuckle is now moved to a third station and the machined radial mounting flange is placed on a reference datum surface and a clamping force is directed through the pilot surface on the wheel hub to retain the mounting flange in contact with the reference datum surface;

piercing one of the first and second bosses on the knuckle to hold the knuckle in a stationary position;

the attachment area on each of the plurality of projection is machined to define a connecter surface through which the knuckle is attached to another member;

the knuckle is moved to a fourth station and a rotor is placed on the pilot surface of the wheel hub and secured by bolts that pass through the plurality of axial openings in the mounting flange that bring a face on the rotor into engagement with the machined radial mounting flange to bring first and second braking surfaces on the rotor into in perpendicular alignment with the bases of the plurality of mounting pads; and rotating the rotor to check the perpendicular alignment checked and if necessary further machining the first and second braking surfaces to achieve the desired perpendicular relationship with respect to the bases of the plurality of locator pads.

It is an object of this invention to provide a method of manufacturing a corner module assembly for a vehicle that is sequentially constructed from a plurality of components such that a plurality of locator pads on a knuckle are utilized to align first and second braking surfaces on a rotor with the axis of a cylindrical body on the knuckle.

It is a further object to this invention to provide a corner assembly for a vehicle wherein lateral runout for a rotor is reduced by sequentially machining surfaces on a rotor while clamping on locator pads on a knuckle that are located adjacent a cylindrical housing for a bearing assembly to eliminate tolerances stack up during the assembly of the individual components that make up the corner assembly.

It is another object of this invention to provide a corner assembly for a vehicle wherein a knuckle is retained by clamping onto locator pads while machining a radial mounting flange on a wheel hub and bosses for a caliper such that friction surfaces on a rotor held against the mounting flange is positioned in a parallel plane with brake pads carried by the caliper.

The present invention provides for a corner module assembly wherein braking surfaces on rotor are located in a perpendicular relationship with an axis of a bearing assembly while a caliper attached to a knuckle retains friction members in a same parallel relationship with the braking surfaces.

BRIEF DESCRIPTION OF THE DRAWINGS

FIG. 3 is a section view taken along line 3-3 of FIG. 1;

FIG. 13 is a sectional view of the knuckle that is retained in the second fixture by clamping onto the locator pads for machining brake surfaces on a rotor attached to the wheel hub; and FIG. 14 is a sectional view of the knuckle of FIG. 13 after a caliper is attached thereto to define a corner module assembly.

DETAILED DESCRIPTION OF THE INVENTION

Figure 1:
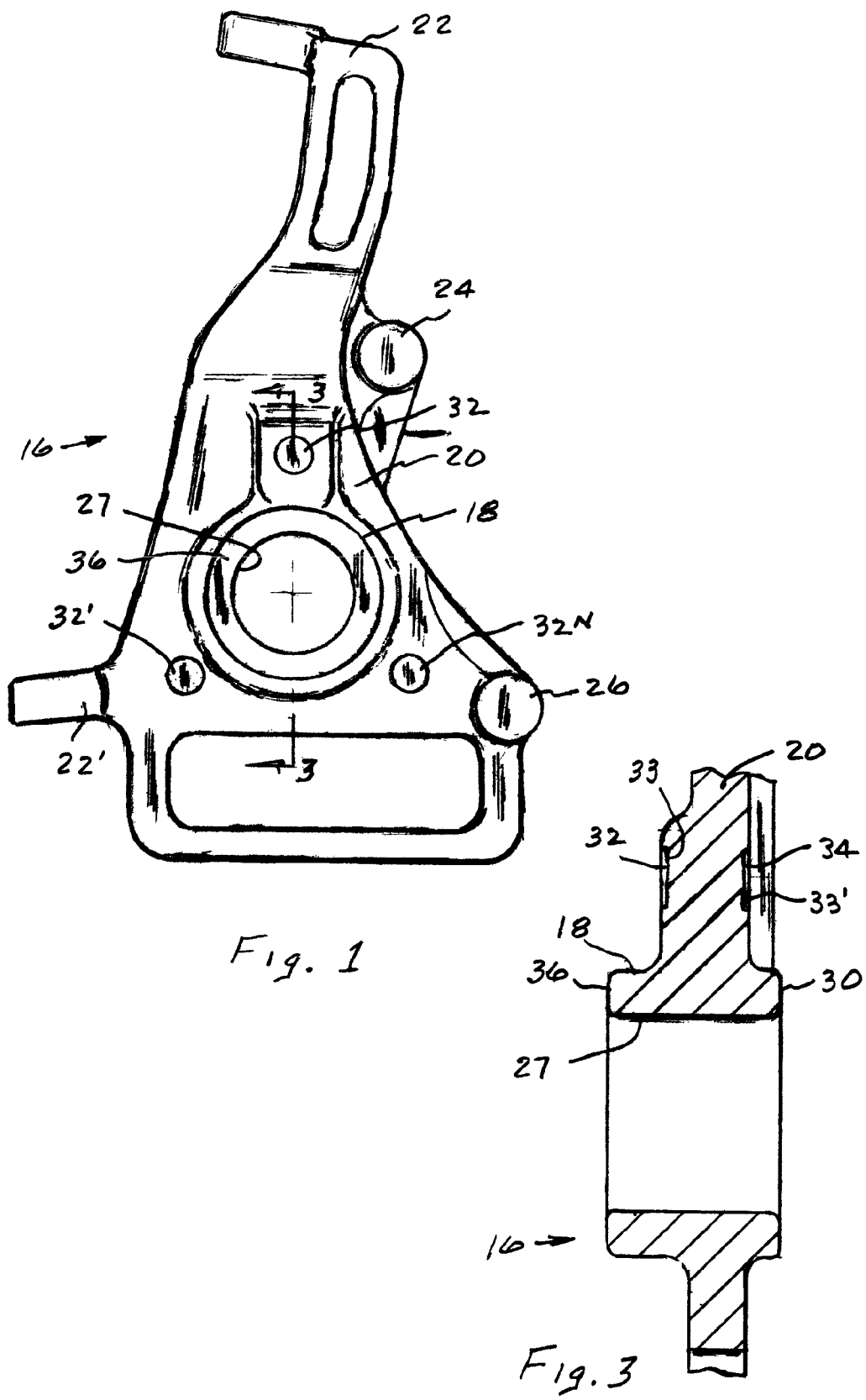
FIG. 1 is a front elevation view of a knuckle for use in a corner module assembly according to the present invention.
Figure 2:
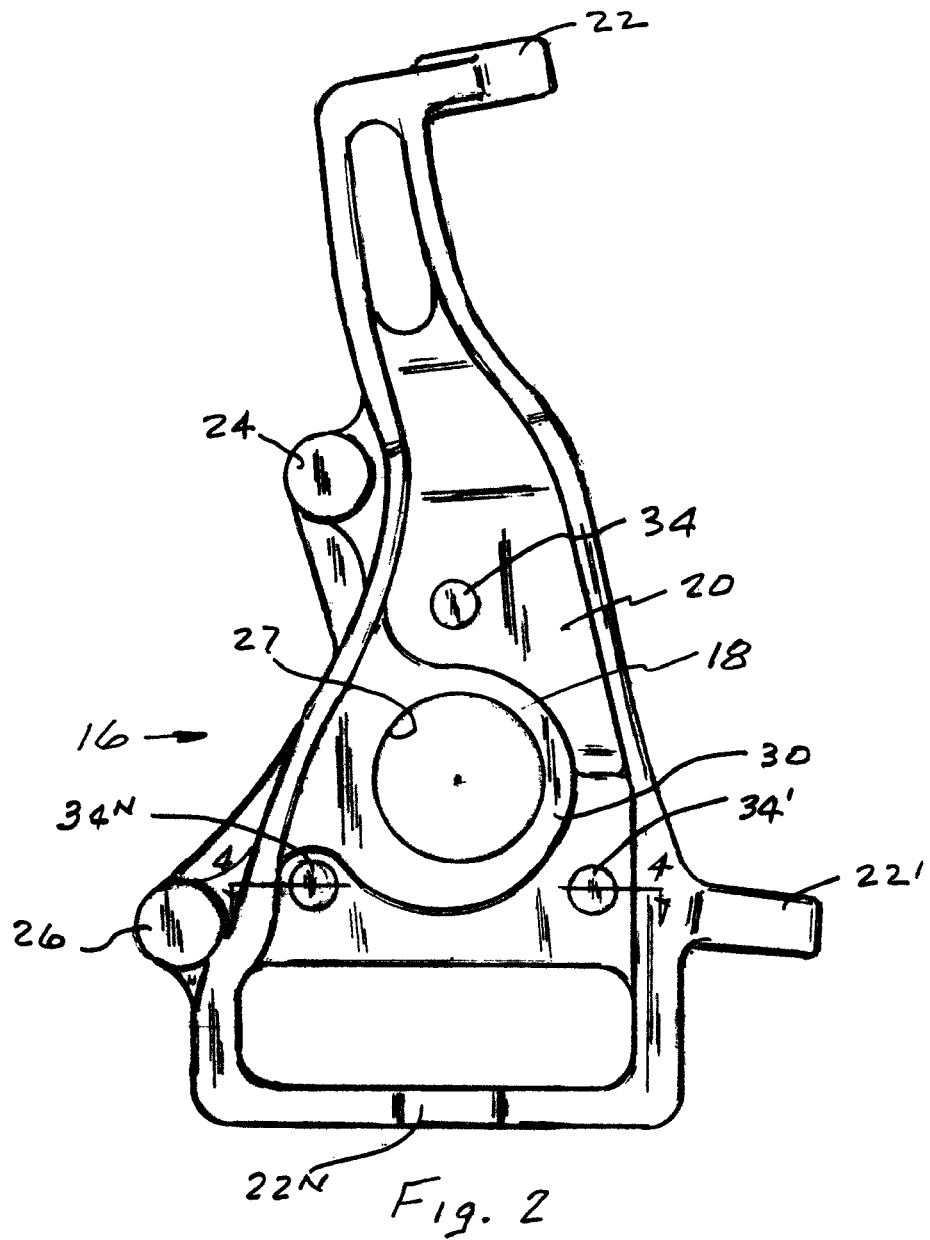
FIG. 2 is a rear elevation view of the knuckle of FIG. 1.
Figure 4:
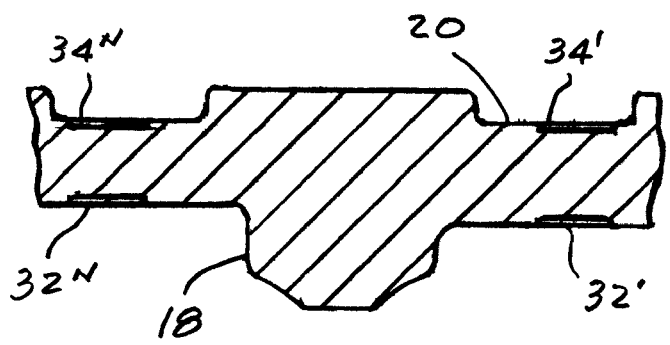
FIG. 4 is a section view take along line 4-4 of FIG. 2.

In the various embodiments for the corner module assembly, same components are identified by a same number and only when structural components are different is a new number assigned even though they may function in a similar manner.

A corner module assembly 10 of the present invention is illustrated in FIG. 14 and manufactured through a succession of steps illustrated in FIGS. 1-13. The corner nodule assembly 10 is distinguished in that braking surfaces located on a rotor 12 are located in parallel alignment with wear faces on friction members 19, 19' associated with a caliper 14 that spans the rotor 12 and with the bases 33, 33' of locator pads on a knuckle 16. The parallel alignment enhances the uniform engagement of the wear surfaces with the braking surfaces during a vehicle braking event while improving the running clearance between the rotor 12 and the wear surfaces of the friction members during off-brake driving. The alignment is achieved through the sequential machining of various surfaces on the corner module by clamping onto a plurality of locator pads or reference surfaces on a knuckle 16 to assemble the corner module assembly 10.

A method of manufacturing and assembly of the corner module 10 may be achieved through the following sequentially steps.

Figure 5:
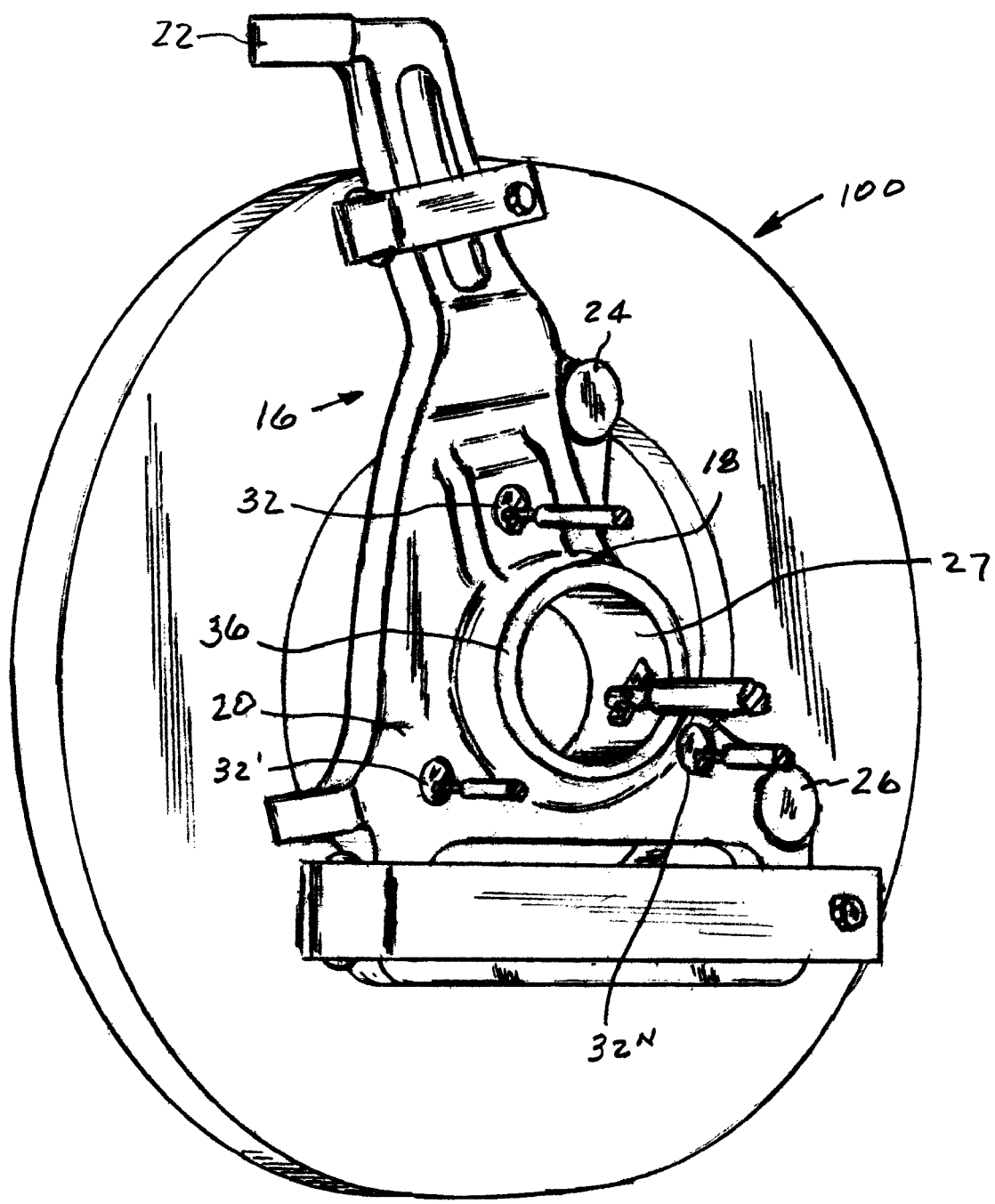
FIG. 5 is a perspective view of the knuckle of FIG. 1 located in a first fixture for machining an axial bore within a cylindrical body of the knuckle and a first plurality of locator pads on the front surface of the web that are in a perpendicular relationship with the axial bore.
Figure 6:
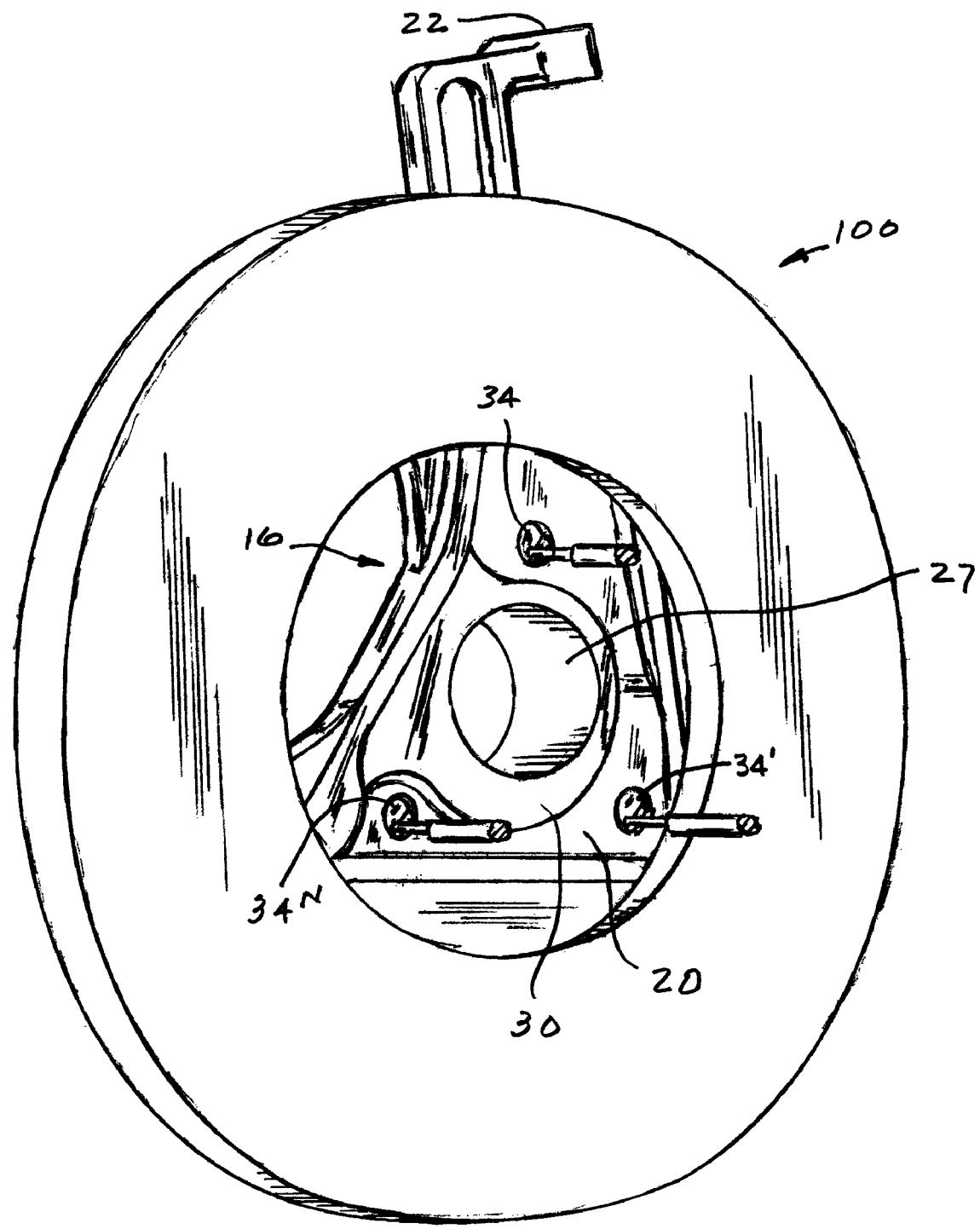
FIG. 6 is a perspective view of the knuckle retained in the FIG. 5 for machining a second plurality of locator pads on the rear surface of the web that are in a perpendicular relationship with the axial bore.
Figure 7:
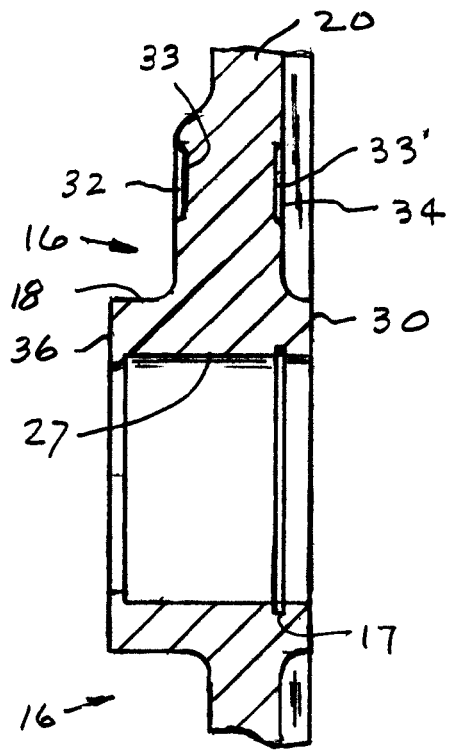
FIG. 7 is a sectional view of the knuckle of FIG. 3 after the axial bore and plurality of locator pads have been machined therein.

A knuckle 16, as shown in FIGS. 1, 2 3 and 4, is obtained from a source. The knuckle 16 is distinguished by a cylindrical body 18 that extends from a web or base 20 and a plurality of projections 22, 22' . . . 22n that extend from the web 20 that have surfaces through which the knuckle 16 is attached to other members. In addition, the web 20 has bosses 24 and 26 that define brackets for the attachment of caliper 14 to the knuckle 16, a top plurality of locator pads 32, 32' . . . 32n and a bottom plurality of locator pads 34, 34' . . . 34n and a cylindrical body 18 has an axial bore 27 that extends from a first end surface 30 to a second end surface 36. The knuckle 16 is placed and held stationary in a first fixture 100 where an axial bore 27 is machined in cylindrical body 18 and the top locator pads 32, 32' . . . 32n, as illustrated in FIG. 5, and a plurality of bottom locator pads 34,34' . . . 34n, as illustrated in FIG. 6, are machined such that the base 33 of each top locator pads 32,32' . . . 32n and base 33' of each bottom locator pads 34,34' . . . 34n is located in a plane that is perpendicular to axial bore 27 as best illustrated in FIG. 7. It is not deemed necessary that a knuckle 16 have both top and bottom locator pads but both may be used if greater quality control is achieved from there use. Thus, even though an individual locator pad may be in a different plane than another locator pad, the bases 33, 33' are all located in planes that are perpendicular to the axial bore 27 and assist in retaining this relationship during the assembly of the corner module 10.

A bearing assembly 40 is obtained from a source and is distinguished by a plurality of rollers 44,44' . . . 44n that are retained between an outer race 42 and an inner race 46. The bearing assembly 40 is inserted into the axial bore 27 of knuckle 16, and may be held in axial bore 27 by many various retention methods such as a locating a snap ring 43 in a groove 17 as illustrated in FIG. 8.

Thereafter, a wheel hub 56 is obtained from a source. The wheel hub 56, see FIG. 8, is distinguished by a cylindrical body 58 having a first end 60 and a second end 62, a pilot surface 64 that extends from the first end 60 to a peripheral radial mounting flange 66 that is located between the first end 60 and the second end 62, a peripheral bearing surface 72 that extends from the second end 62 to a shoulder 74 that is adjacent the radial mounting flange 66, and a plurality of axial openings 68,68' . . . 68n (only two are shown) in the mounting flange 66 that are located a fixed radial distance from the axis of second cylindrical body 28 for receiving mounting studs 70,70' . . . 70n.

The wheel hub 56 with mounting studs 70, 70' . . . 70n attached thereto is inserted into the knuckle 16 such that the bearing assembly 40 is located on bearing surface 72. The wheel hub 56 may be retained in the bearing assembly 40 through a plurality of fastener arrangements such as rolling end 62 onto the inner race 46 as illustrated in FIG. 8, treading a nut onto end 62 or locating a snap ring in a groove on end 62 to define a unitary member. The attachment of the wheel hub 56 to the knuckle 16 defines a unitary member and completes a sub-assembly process for the corner nodule assembly 10 and could be independently performed by a third party.

Figure 8:
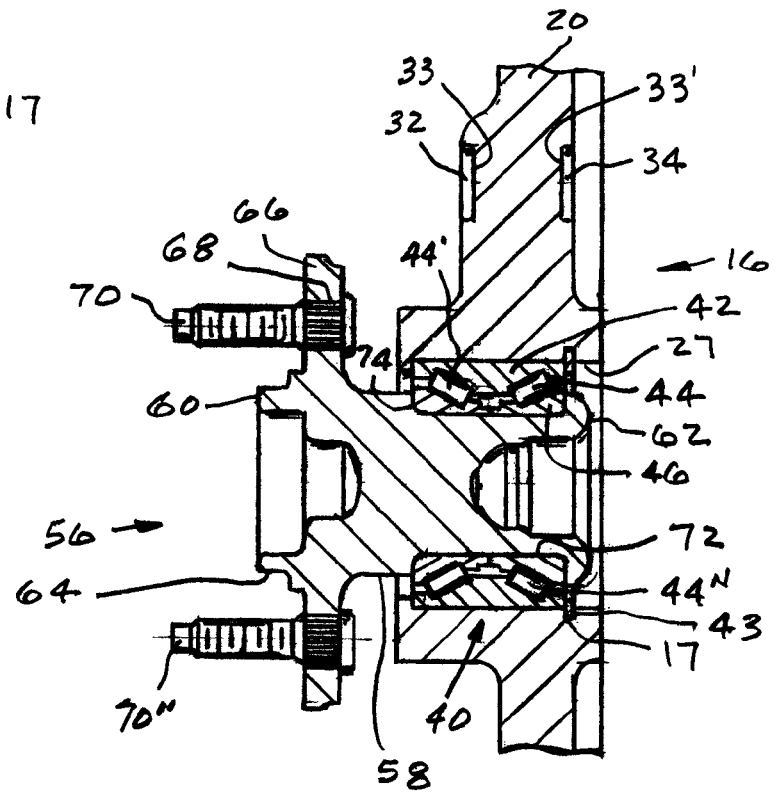
FIG. 8 is a sectional view of the knuckle of FIG. 7 after a bearing has been fixed in the axial bore and a wheel hub attached thereto.
Figure 9:
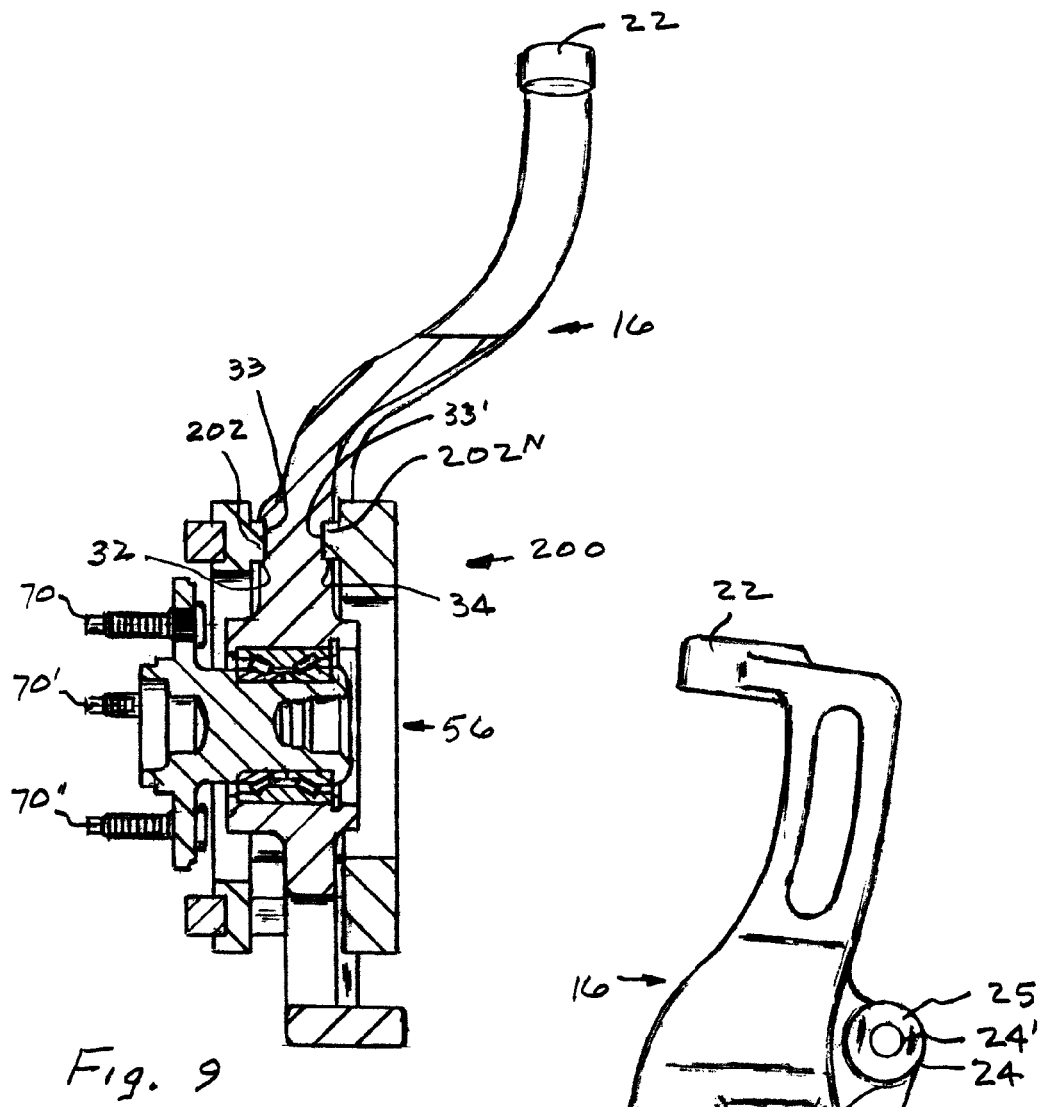
FIG. 9 a sectional view of the knuckle of FIG. 8 that is retained in a second fixture by clamping onto the locator pads.
Figure 10:
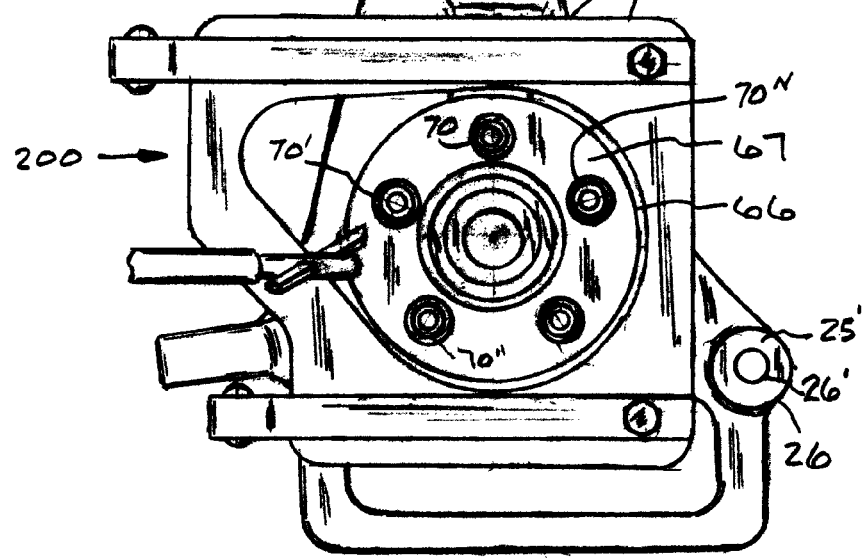
FIG. 10 is a front view illustrating the machining a mounting flange on the wheel hub and first and second bosses of the knuckle of FIG. 9.

The unitary member defined by knuckle 16 and wheel hub 56 shown in FIG. 8 is obtained from a source and placed in a second fixture 200 as illustrated in FIG. 9. When in the second fixture 200, projections 202, 202' ... 202n that extend from the second fixture 200 and may be located in either the top locator pads 32, 32' ... 32n and/or the bottom locator pads 34, 34' ... 34n. A clamping force is applied through the locator pads such that the knuckle 16 is located in a desired orientation with respect to bases 33, 33' which serves as a first datum plane from which all subsequent machining is based. To achieve the machining, a first tool is applied to a face 67 on the radial mounting flange 66 to remove material from the face 67 and define a parallel relationship with the bases 33,33' of the locator pads, see FIG. 10, a second tool is applied to front faces 25,25' on bosses 24 and 26 to remove material there from and define a parallel relationship with the bases 33,33' of the locator pads and a third tool is applied to rear faces of boss 24 and boss 26 to remove material there from. As shown, bore 24' in boss 24 and a bore 26' in boss 26 may also be drilled or machined at this time to assure a perpendicular relationship is achieved with the datum base defined by bases 33,33' on the pads. Thus, all the machining is based on a relationship that has been established with respect to the parallel planes of the bases 33, 33' for the pads and is unaffected by a tolerance build up that may have been created during the assembly of the bearing assembly 40 and wheel hub 56 in the knuckle 16.

Figure 11:
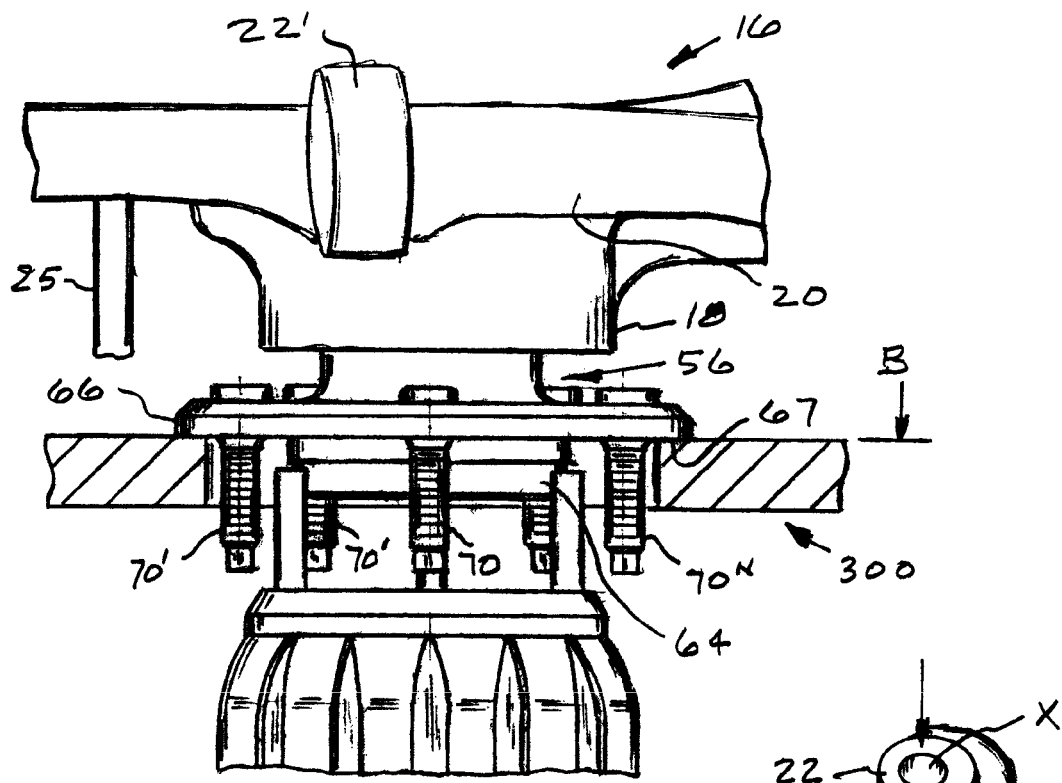
FIG. 11 is a side elevation view of the knuckle of FIG. 10 retained in a third fixture by locating the mounting flange on a datum surface and clamping on a pilot flange on the wheel hub.
Figure 12:
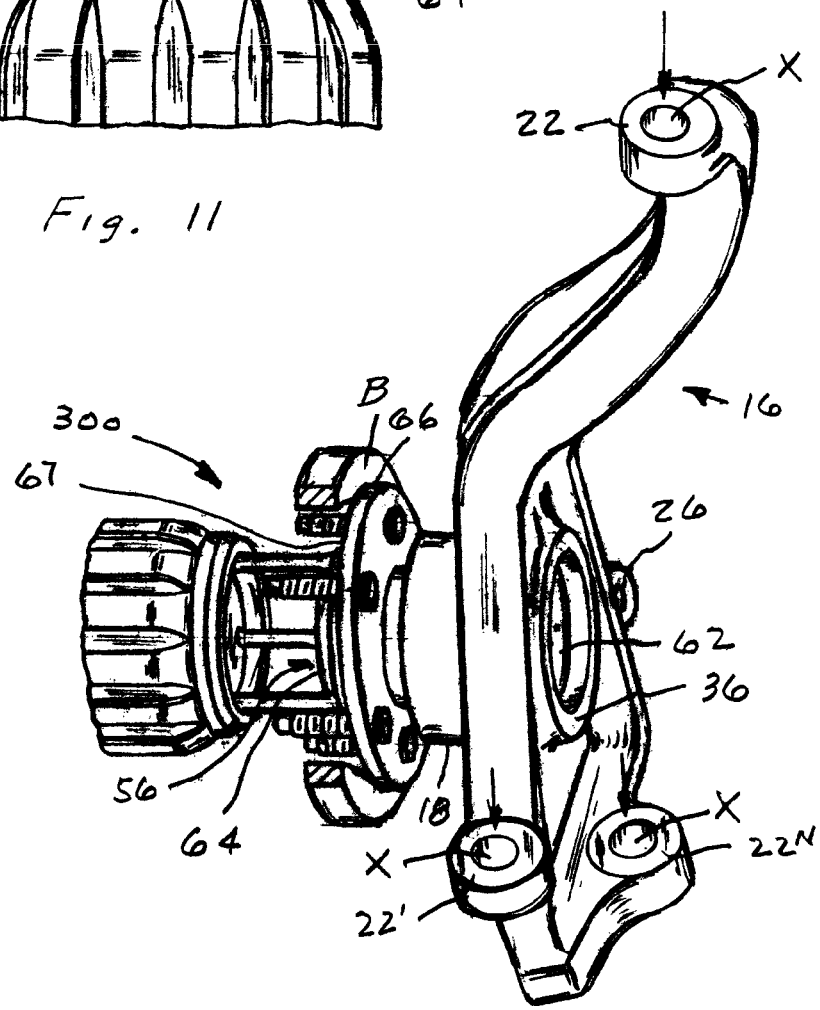
FIG. 12 is a perspective view of the knuckle of FIG. 11 illustrating the machining of mounting surfaces on the knuckle through which the knuckle is attached to a vehicle.

After face 67 on the radial mounting flange 66 and bosses 24 and 26 have been machined, it may be desirable to machine the attachment location on each of the plurality of projections 22, 22' ... 22n. This may be achieved by moving the knuckle 16 to a third fixture 300 as illustrated in FIG. 11 where machined face 67 on the radial mounting flange 66 is placed on a datum surface B and the knuckle 16 is held by a clamping force applied to the pilot surface 64. A projection 25 is passed through one of the bores 24, 26' in bores 24, 26 to hold the knuckle 16 in a desired orientation and a fourth tool is brought into engagement with the attachment locations to either drill a bore "x" or cut a taper in projections 22, 22n that receive ball studs and in projection 22' that receive an idler arm associated with the steering system for the vehicle, see FIG. 12. Once the attachment surfaces on the plurality of projections 22, 22' ... 22n have been machined, the knuckle 16 is returned to the second fixture 200 as illustrated in FIG. 13 wherein projections that extend from the fixture are located in either the top locator pads 32, 32' ... 32n and/or bottom locator pads 34, 34' ... 34n and clamped therein to reestablish the datum plane with the bases 33, 33' of the pads.

A rotor 12 is obtained from a source and defined by disc member 80 having an inner or axial opening 82 with a radius corresponding to pilot surface 64 on wheel hub 56, an alignment surface 84 adjacent the inner opening and parallel braking surfaces 86,86' that are located adjacent peripheral surface 88.

The axial opening 82 of the rotor 12 is placed on the pilot surface 64 and keepers 71, 71' ... 71n are attached to studs 70, 70' ... 70n to bring the alignment surface 84 into engagement with face 67 radial alignment flange 66 such that braking surfaces 86, 86' are located in parallel planes with respect to the bases 33, 33' of the locator pads, see FIG. 13.

The rotor 12 is rotated and the parallel alignment of the braking surfaces 86, 86' are evaluated by either a gauge on the second fixture or a laser beam. If a desired parallel alignment is achieved, a caliper 14, as illustrated in FIG. 14, that straddles the rotor 12 is attached to bosses 24 and 26 by passing bolts through bores 24' and 26'. The friction pads 19, 19' associated with caliper 14 are moved to simulate a brake application wherein the faces uniformly engages the braking surfaces 86, 86' during a brake application. If the desired parallel alignment is not present, a fifth tool is applied to the braking surfaces 86,86' to achieve the desired parallel relationship with the bases 33,33' on the locator pads, as illustrated in FIG. 13.

Thus, in this process all of the alignment of all of the component parts of the corner module 10 is based on a same datum plane defined by the bases 33, 33' of the locator pads and as a result any tolerance build up from the individual components is sequentially cancelled as a different component is added and surfaces machined during the assembly of the corner module 10.

What is claimed is:

1. A method of manufacturing a corner module assembly wherein first and second faces on a rotor are aligned in perpendicular planes with an axial bore of a knuckle comprising the following steps:

obtaining knuckle from a source, said knuckle having a first cylindrical body with an axial bore that extends from a first end to a second end and a plurality of projections that radiate from a web adjacent the cylindrical body wherein each projection has an attachment location area through which the knuckle is fixed to another member;

placing said knuckle in a first fixture and machining said axial bore, a first plurality of surfaces surrounding said first cylindrical body to define a plurality of locator pads and a second plurality of surfaces to define first and second bosses wherein a base for each of the plurality of locator pads is located in a plane that is perpendicular to said axial bore and parallel with the first and second bosses;

obtaining a bearing assembly from a source and inserting the bearing assembly into the axial bore of the knuckle;

obtaining a wheel hub from a source, said wheel hub being defined by a second cylindrical body with a first end and a second end, a pilot surface that extends from the first end to a peripheral radial mounting flange that is located between the first end and the second end, said mounting flange having a plurality of axial openings that are located a fixed radial distance from an axis of said second cylindrical body, and a peripheral bearing surface that extends from the second end to a shoulder adjacent the radial mounting flange;

attaching said wheel hub to said knuckle with the bearing assembly being located on said peripheral bearing surface;

placing said knuckle in a second fixture and holding said knuckle in the second fixture by clamping on said plurality of locator pads;

thereafter, rotating said wheel hub while machining said mounting flange to remove any material thereon not in parallel alignment with the bases of said plurality of locator pads; and finally machining said first and second bosses to assure that the first and second bosses are in parallel alignment with the plurality of locator pads.

2. The method of manufacturing a corner module assembly as recited in claim 1 further including the step of:

placing a rotor on said pilot surface of the wheel hub and securing the rotor to the wheel hub by bolts that pass through the plurality of axial openings in said mounting flange that bring a face on the rotor into engagement with the radial mounting flange such that first and second braking surfaces on the rotor are located in parallel alignment with the bases of the plurality of mounting pads.

3. The method of manufacturing a corner module assembly as recited in claim 2 further including the step of:

further machining, if necessary, said first and second braking surfaces to assure that a parallel relationship is present with respect to the bases of said plurality of locator pads.

4. The method of manufacturing a corner module assembly as recited in claim 1 further including the step of:

moving the knuckle to a third fixture and placing said machined radial mounting flange on a reference datum surface;

locating the knuckle by piercing one of said first and second bosses;

applying a clamping force that is directed through said pilot surface of the wheel hub to retain said mounting flange in contact with the reference datum surface; and thereafter machining an attachment area in each of the plurality of projections to define a connecter surface through which the knuckle is connected to another member.

5. The method of manufacturing a corner module assembly as recited in claim 1 further including the step of:

machining each attachment area of the plurality of projections to define a connector surface through which the knuckle is connected to another member.

* * * * *